US009669683B2

(12) United States Patent
Kemmerling et al.

(10) Patent No.: US 9,669,683 B2
(45) Date of Patent: Jun. 6, 2017

(54) AIR CONDITIONING SYSTEM

(71) Applicant: MAHLE International GmbH, Stuttgart (DE)

(72) Inventors: Juergen Kemmerling, Oberleuken (DE); Anthony Auert, Arlon (BE)

(73) Assignee: MAHLE International GmbH, Stuttgart (DE)

( * ) Notice: Subject to any disclaimer, the term of this patent is extended or adjusted under 35 U.S.C. 154(b) by 267 days.

(21) Appl. No.: 14/400,832

(22) PCT Filed: May 15, 2013

(86) PCT No.: PCT/EP2013/060009
§ 371 (c)(1),
(2) Date: Nov. 13, 2014

(87) PCT Pub. No.: WO2013/171250
PCT Pub. Date: Nov. 21, 2013

(65) Prior Publication Data
US 2015/0140918 A1    May 21, 2015

(30) Foreign Application Priority Data
May 15, 2012 (EP) .................................... 12168123

(51) Int. Cl.
*B60H 1/24* (2006.01)
*B60H 3/06* (2006.01)
(Continued)

(52) U.S. Cl.
CPC ............. *B60H 1/24* (2013.01); *B60H 3/0616* (2013.01); *B60H 2001/00085* (2013.01)

(58) Field of Classification Search
None
See application file for complete search history.

(56) References Cited

U.S. PATENT DOCUMENTS 4,587,890 A      5/1986  Hurlburt
4,630,530 A  *  12/1986  Eckstrom ........... B60H 1/00371
                                                    4/209 FF
(Continued)

FOREIGN PATENT DOCUMENTS

DE        10245252 A1    4/2004
EP         0744309 A1   11/1996

*Primary Examiner* — Gregory Huson
*Assistant Examiner* — Eric Gorman
(74) *Attorney, Agent, or Firm* — Brinks Gilson & Lione

(57) ABSTRACT

The invention is about a vehicle air conditioning system wherein an air stream can flow axially along a stream direction. The system has a filter held in a compartment in a substantially transversal plane. The filter compartment has an inlet opening and an outlet opening and is delimited by peripheral walls comprising a back wall, two lateral walls and a front wall. The filter compartment is provided with a removable service drawer comprising a front panel, and an adjacent floor portion extending backwards from the front panel. When the service drawer is closed the front panel is adjacent the front wall and, when opening the service drawer, a service opening opens in place of the front panel and in place of the floor portion leaving for the filter a passage allowing removal of the filter along a removal direction inclined relative to the transversal plane.

8 Claims, 3 Drawing Sheets

(51) Int. Cl.
*F24F 13/28* (2006.01)
*B01D 46/10* (2006.01)
*B01D 46/00* (2006.01)
*B60H 1/00* (2006.01)

(56) References Cited

U.S. PATENT DOCUMENTS

| | | | | |
|---|---|---|---|---|
| 5,221,292 | A * | 6/1993 | Aoyama | B01D 46/0038 |
| | | | | 454/158 |
| 6,039,777 | A * | 3/2000 | Lee | B01D 46/0005 |
| | | | | 55/385.3 |
| 6,758,739 | B1 * | 7/2004 | Sangwan | B60H 1/008 |
| | | | | 454/139 |
| 2002/0037244 | A1 * | 3/2002 | Takahashi | A61L 9/16 |
| | | | | 422/297 |
| 2004/0083895 | A1 * | 5/2004 | Kim | B01D 46/0086 |
| | | | | 96/414 |
| 2005/0142045 | A1 * | 6/2005 | Yuen | A61L 9/20 |
| | | | | 422/186.3 |
| 2005/0169813 | A1 * | 8/2005 | D'Amico | A61L 9/042 |
| | | | | 422/124 |
| 2007/0238406 | A1 * | 10/2007 | Jeong | B60H 1/00849 |
| | | | | 454/139 |
| 2009/0165432 | A1 * | 7/2009 | Yabu | F24F 1/0007 |
| | | | | 55/415 |

* cited by examiner

AIR CONDITIONING SYSTEM

TECHNICAL FIELD

The present invention relates to an air conditioning system and more specifically to an air filter compartment.

BACKGROUND OF THE INVENTION

Air conditioning systems integrate a filter that is installed transversally to the air flow for removing foreign matters that may be transported in the flow. The filter needs service such as cleaning or replacement. To be removed and reinstalled in its compartment a service opening is operated in a wall of the compartment. Under normal operation a panel closes the service opening. It happens that an obstacle such as a vehicle cross-car beam prohibits full opening of the panel making difficult the filter service.

In EP 1902678, Ferrarese proposes to split the filter in a top and a bottom elements separated by an articulated intermediate panel. A service opening arranged facing the bottom element enables removal of said bottom element and, when said bottom element is removed, the articulated panel inclines guiding the top element toward the service opening.

In U.S. Pat. No. 4,925,526, Noriaki et al. propose to divide the filter in a plurality of elements articulated one to the other, said articulations enabling to install the elements one by one. In addition to the articulation Klein proposes in EP 2025543 to break the filter for removing it from its compartment.

In EP0744309, Aragno proposes to install the filter in a drawer that can fully open or can be removed so the filter is upwardly removed for service.

The filter is a crucial component of the system and servicing should be easy. Furthermore, the filter itself must be economically designed and any addition such as plurality of elements and articulating means should be avoided as much as possible. Nevertheless it is known by professionals that all components cannot be installed in the front face of a system in an easy accessible way and some have to be behind others. Consequently the air conditioning filters are quite often difficult to access and to service resulting in additional operations, time and cost.

It is important to propose to the market solutions to the above mentioned problems and particularly maintaining a serviceable one piece filter.

SUMMARY OF THE INVENTION

Accordingly, it is an object of the present invention to provide an air conditioning system which filter can easily be serviced.

The present invention is about a vehicle air conditioning system wherein an air stream is able to flow axially along a stream direction. The system has a filter held in a filter compartment which is substantially in a transversal plane. The filter removes foreign matters from the air stream. The filter compartment has an inlet opening and an outlet opening and is delimited by peripheral walls comprising a back wall, two lateral walls and a front wall. The filter compartment is further provided with a removable service drawer comprising a front panel and an adjacent floor portion extending backwards from the front panel such that, when the service drawer is closed the front panel is adjacent the front wall and, when opening the service drawer, a service opening opens in place of the front panel and in place of the floor portion leaving for the filter a passage allowing removal of the filter along a removal direction inclined relative to the transversal plane. Consequently, the filter can advantageously be serviced, installed or removed, from the filter compartment, even though an obstacle would be close to the front wall prohibiting easy and straight access to the filter.

The filter compartment is further provided with lateral ribs providing axial support to the filter. Each lateral rib is provided beyond its front extremity with a fixed ramp oriented toward the service opening so that when the service drawer is open the filter can be guided through the service opening in following the fixed ramps.

The service drawer is further provided with lateral arms protruding from the front panel toward an arm extremity so that when the service drawer is closed each lateral arm provides axial support to the filter. Each lateral arm is provided beyond its arm extremity with an arm ramp so that when closing the service drawer and installing the filter the arm ramps push the filter inside the compartment easing the installation of the filter. Each lateral arm has a supporting flange extending from the front panel to the arm extremity providing axial support to the filter and a stiffening flange providing rigidity to the lateral arm avoiding the supporting flange to bend. The stiffening flange is perpendicular to the supporting flange and extends beyond the arm extremity forming the arm ramps.

When the service drawer is closed, each supporting flange aligns with a lateral rib constituting straight and continuous lateral surfaces perpendicular to the lateral wall supporting the filter all along the lateral wall.

The service drawer being closed, each of the arm extremity is close to a front extremity of a lateral rib and, each of the arm ramp engages under a lateral rib while the fixed ramp engages under the lateral arm.

The present invention is also about a filter for a vehicle air conditioning system as described above. The filter is provided with at least one transverse slit. The slit is shallower than the thickness of the filter to maintain integrity of the filter. The slit opens in a V shape when the filter bends in passing through the service opening. This is done in order to ease the bending of the filter when inserting or removing it into or from the filter compartment.

BRIEF DESCRIPTION OF THE DRAWINGS

The present invention is now described by way of example with reference to the accompanying figures in which.

DETAILED DESCRIPTION OF THE PREFERRED EMBODIMENTS

In the following description, similar elements could be designated with the same reference numbers.

Figure 1:
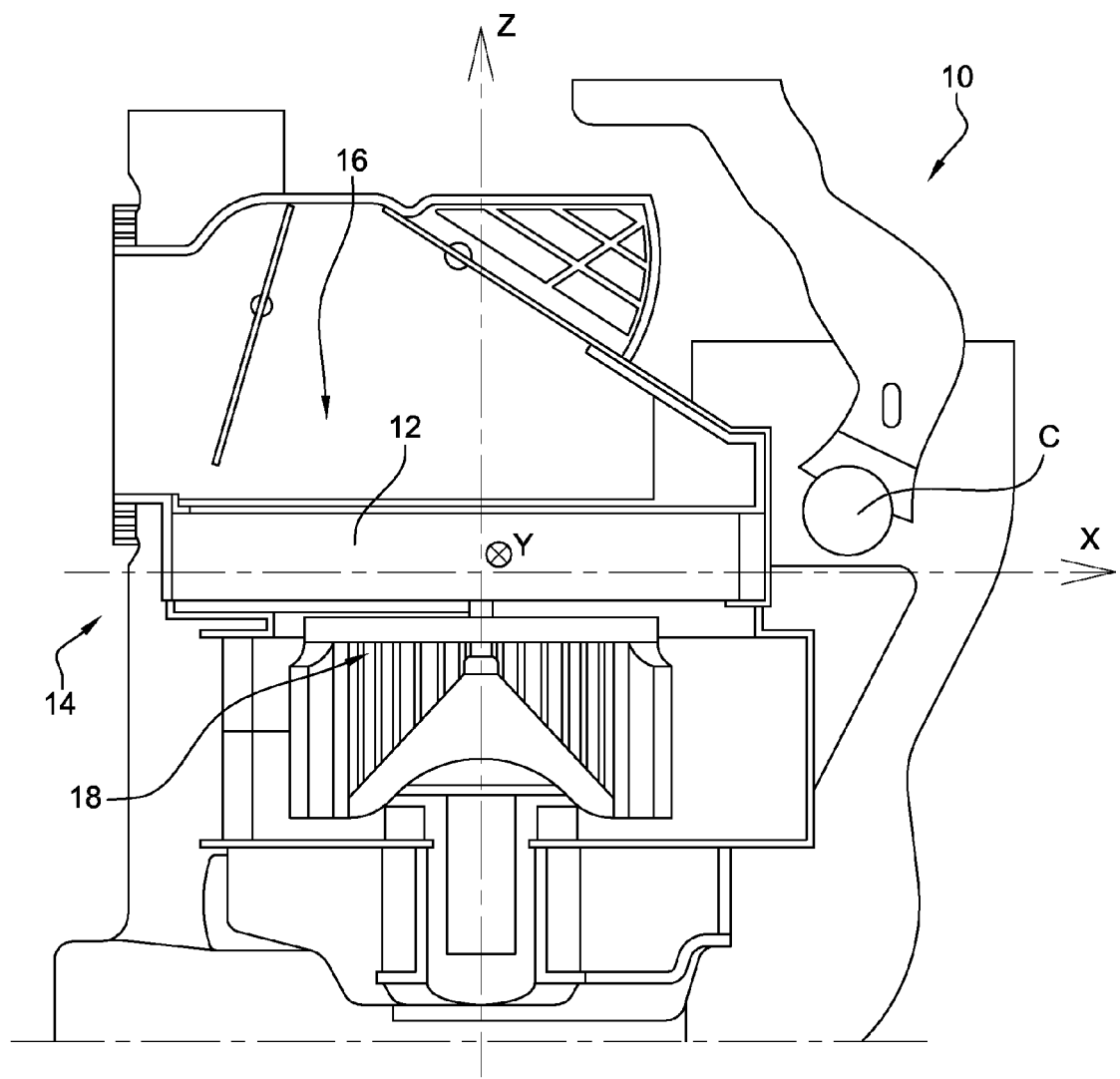
FIG. 1 is a general view of an air conditioning system positioned in a vehicle, with the filter compartment being near the cross car beam.

The following description will use a tri-orthogonal direct coordinate system (X, Y, Z) as shown in the figures, where axis X will be identified as the opening axis, axis Y the transverse axis and axis Z the vertical or stream axis. For clarity and concision purposes, and to ease the understanding of the description, a bottom-up orientation, as shown in FIG. 1, will also be used. The terms low, high, over, under, horizontal and vertical, as well as the orientation downward, downwardly, upward, upwardly may be utilized without any intention to limit the scope of the invention, especially in regards of the numerous possibilities of installation of the system in a vehicle.

FIG. 1 represents a vehicle air conditioning system 10 installed in a vehicle. Particularly visible is an air filter 12 held in a filter compartment 14 that is substantially in a horizontal plane XY. The system 10 is installed in proximity of the cross car beam C that constitutes an obstacle to servicing the filter 12.

FIGS. 2 to 7 depict the filter compartment 14 with the filter 12 held in or being serviced. The filter compartment 14 has a parallelepiped shape with a bottom inlet 18 opposite to a top outlet 16, both the inlet 18 and the outlet 16 are rectangular planes normal to the stream axis Z. Alternative shapes are of course possible. The filter compartment 14 also has a back wall 20, two lateral walls 22, and a front wall 24. The filter compartment 14 is further provided with a filter service drawer 26 that has a front panel 28 and a perpendicular floor portion 30. On FIG. 2, the service drawer 26 is closed and the front panel 28 closes a cut-out of the front wall 24. The service drawer 26 opens by translating in the opening axis X direction. Alternative opening ways of the service drawer are possible such as, for instance, pivoting.

Figure 3:
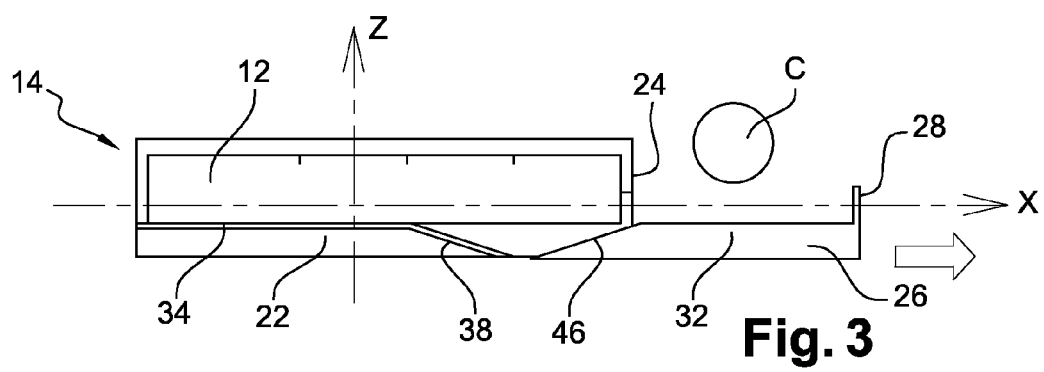
FIG. 3 is the compartment of FIG. 2 where a service opening is provided via the opening of a drawer provided in the compartment.

As shown in FIG. 1, the system 10 is installed proximate the fixed obstacle C close to the front wall 24. This obliges to minimize the height of the service drawer 26 in order for the front panel 28 to slide under the obstacle C when opening, as shown in FIG. 3. A direct consequence of the reduced height of the front panel 28 is that the upper portion of the front wall 24 is fixed and the filter 12 cannot be serviced by straight horizontal translation X. On the figures are represented an intermediate alternative where the front panel of the service drawer is approximately half the height of the front wall and consequently the upper half of the front wall is fixed. Depending on design constrains and the way the service drawer opens, the front panel may be quasi inexistent or to the contrary, may take the all surface of the front wall.

Figure 2:
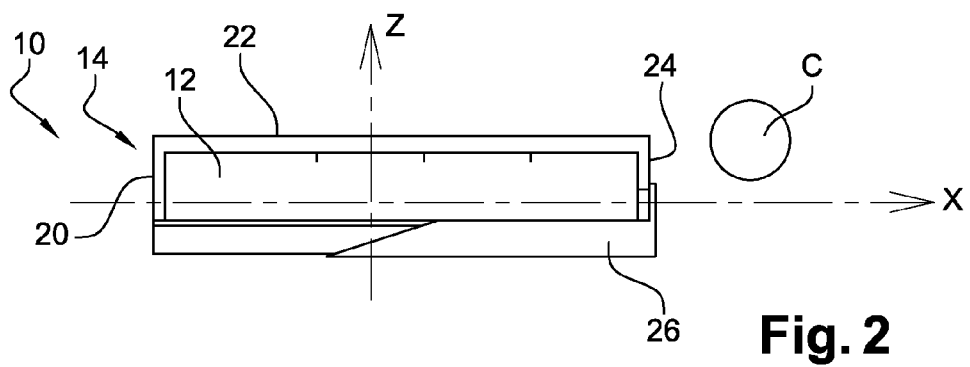
FIG. 2 is a profile section of a filter compartment and its filter, a fixed obstacle preventing easy access to the filter.

In closed position of the service drawer 26—FIG. 2—the filter 12 is held in position inside the compartment 14, in contact with the peripheral walls so no air flow, even minimal, can divert from passing through the filter 12. Furthermore, the filter compartment 14 is provided with peripheral surfaces perpendicularly protruding from each of the walls and holding the filter 12 in place. The width of these peripheral surfaces, measured orthogonally to their wall, is just sufficient to hold the filter 12 and does not disrupt the air flow. For instance, peripheral surfaces may have a width of approximately 15 mm.

Figure 6:
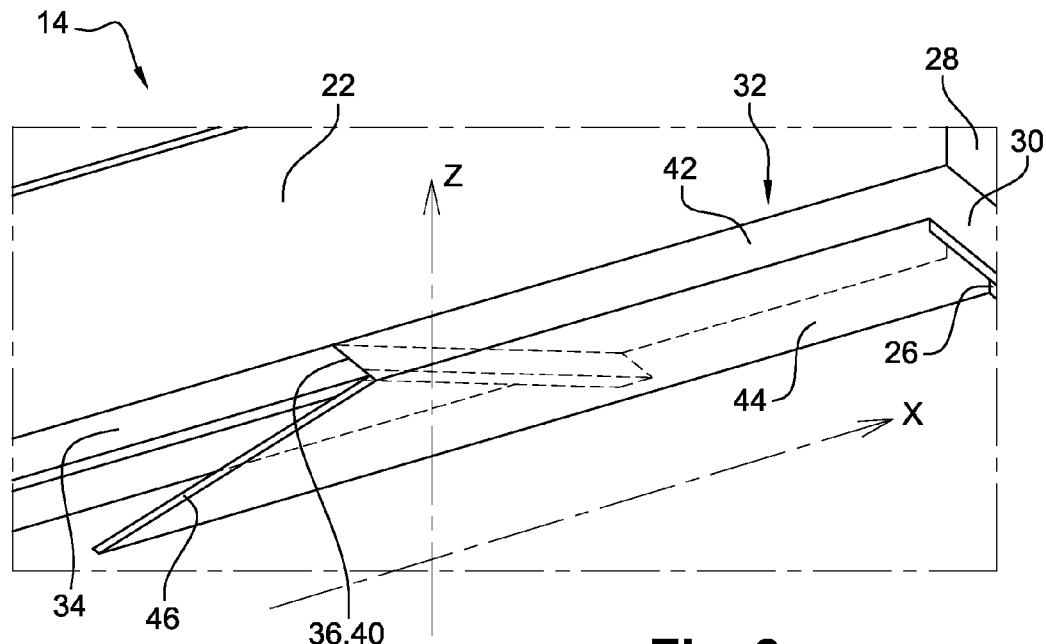
FIG. 6 is a detail of lateral ribs holding the filter in place inside the compartment.
Figure 7:
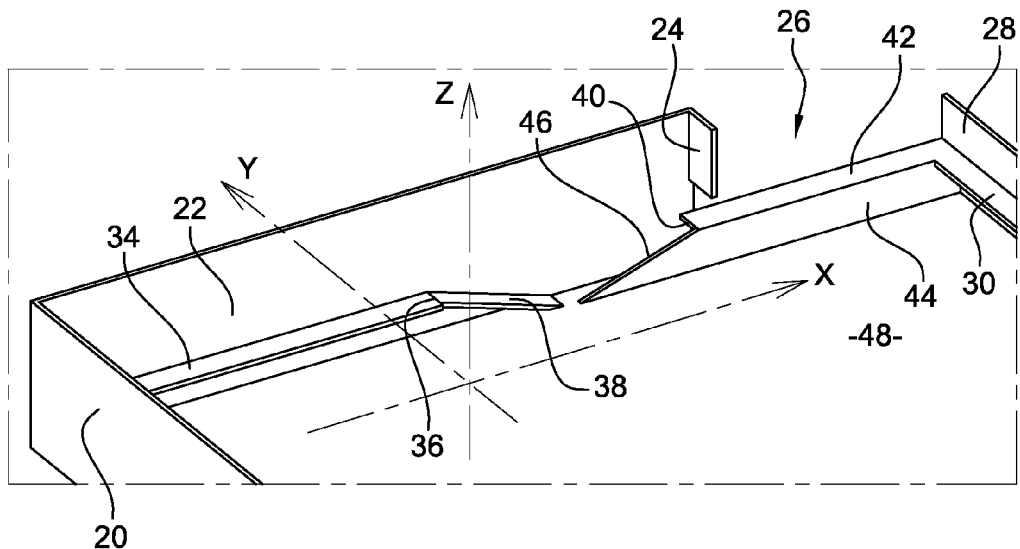
FIG. 7 is the detail of FIG. 6 where the drawer is open.

Better detailed on the perspective FIGS. 6 and 7, the peripheral surfaces comprise two lateral surfaces each comprising a fixed portion, integral to the lateral wall 22, in surface continuity with a movable portion integral to the service drawer 26. The fixed portion forms a lateral rib 34 protruding from the lateral wall 22 and extending straight from the back wall 20 toward the front wall 24 up to a front extremity 36 that is in the middle of the lateral wall 22. Beyond the front extremity 36, each lateral rib 34 forms a fixed ramp 38 inclined downwardly.

Complementary arranged, each movable portion extends straight perpendicularly from the front panel 28, each forming a lateral arm 32 extending toward an arm extremity 40. The lateral arms 32 have an upside-down L-shape section. The horizontal branch of the L-shape is a supporting flange 42 for holding the filter 12 and the vertical branch of the L-shape is a stiffening flange 44 that is parallel and distant from the lateral wall 22. The stiffening flange 44 reinforces the structure of the lateral arm 32 avoiding bending of the supporting flange 42. When the service drawer 26 is closed—FIGS. 2 and 6—each arm extremity 40 comes in contact with the front extremity 36 of the lateral rib 34, thus constituting a continuous straight lateral surface for holding the filter 12. At the arm extremity 40, as detailed on FIG. 7, the supporting flange 42 stops while the stiffening flange 44 is continued forming a downwardly oriented arm ramp 46. As detailed on FIG. 6, when the service drawer is closed, the fixed ramp 38 sets under the supporting flange 42 and the arm ramp 46 sets under the lateral rib 34.

In this description, the junction point of the lateral rib 34 and the supporting flange 42 is set in the middle of the lateral wall 22. Alternatives are possible depending on the design of the system 10, as an example, one can design lateral arms that length all along the lateral wall, the rib being removed and the filter being only held by the lateral arms. Also, a symmetrical construction with ribs extending all along the lateral wall can also be made.

Figure 4:
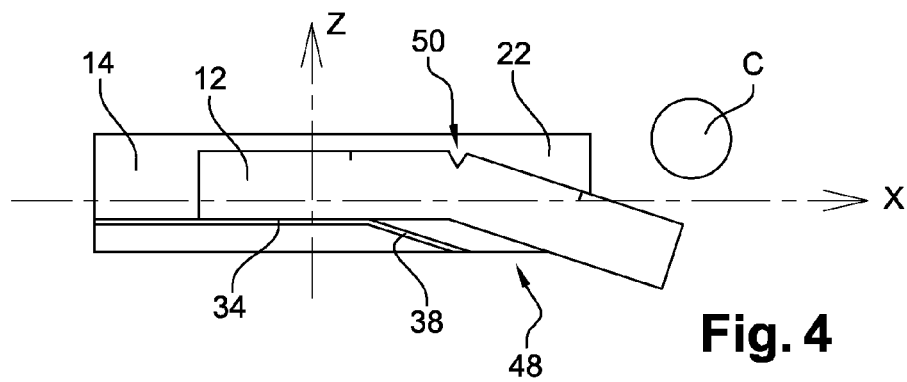
FIG. 4 is the compartment of FIGS. 2 and 3, the filter being extracted through the service opening.

From a utilization perspective, FIGS. 2 to 5 illustrate the servicing of the filter 12. In FIG. 2 the filter 12 is set horizontally inside the filter compartment 14 held by the lateral ribs 34 and the supporting flange 42 of the lateral arms 32. In FIG. 3 the service drawer 26 opens and slides under the obstacle C. In doing so a service opening 48 opens in place of the front panel 28 and of the floor portion 30, leaving way to a passage downwardly inclined relative to the horizontal plane XY for accessing, removing or installing the filter 12. In FIG. 4 the service drawer 26 has been removed and the filter 12 can be exited from the compartment 14. To do so the filter 12 is slightly downwardly bent and extracted through the service opening 48.

Figure 5:
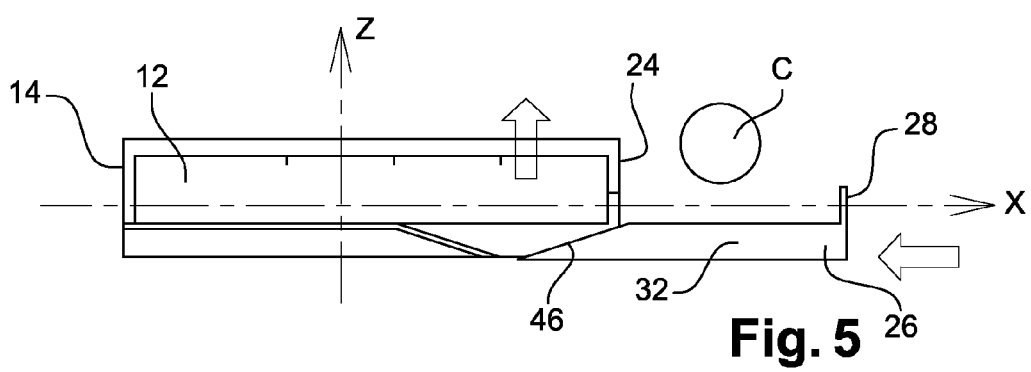
FIG. 5 is the compartment of FIGS. 2, 3 and 4 where the filter has been replaced and the drawer is closing.

To help the bending of the filter 12, the filter 12 is provided with small slits 50 on its top surface, the slits 50 being in the transverse direction Y. The slits 50 are provided by cutting or in using any other process. The slits 50 are shallower than the thickness of the filter 12 so a one-piece integrity of the filter 12 is maintained. When bending the filter 12 the slits 50 that are on the outer surface of the bent open in a V-shape easing the bending. Alternatives to transverse slits exist not requiring cutting the filter 12. Filters that can structurally sufficiently bend alone are an example. Afterward a filter, the same or another one, is reintroduced via the same service opening 48. For re-installing the filter 12 inside the compartment 14, the filter 12 contacts the fixed ramp 38 and is guided by them. To help the filter 12, the service drawer 26 is approached and the arm ramps 46, as shown in FIG. 5, provide support to the filter 12 pushing it upwardly in its place.

The invention claimed is:

1. A vehicle air conditioning system, wherein an air stream is able to flow axially along a stream direction, the system having a filter held in a filter compartment in a transversal plane, that is transverse to the stream direction and defined by an opening axis and a transverse axis, to remove foreign matters from the air stream, the filter compartment having an inlet opening and an outlet opening and being delimited by peripheral walls comprising a back wall, two lateral walls and a front wall, wherein the filter compartment is provided with a removable service drawer comprising a front panel, and an adjacent floor portion extending backwards from the front panel such that, when the service drawer is closed the front panel is adjacent the front wall, wherein, when the service drawer opens by translating along the opening axis, a service opening opens in place of the front panel and in place of the floor portion, leaving for the filter a passage allowing removal of the filter along a removal direction inclined relative to the transversal plane, wherein the service drawer is further provided with lateral arms protruding from the front panel toward an arm extremity so that when the service drawer is closed, each of the lateral arms provides axial support to the filter in the stream direction, wherein each of the lateral arms is provided beyond the arm extremity with an arm ramp so that when closing the service drawer and installing the filter, the arm ramps push the filter inside the compartment easing the installation of the filter.

2. The vehicle air conditioning system as set in claim 1, wherein each of the lateral arms has a supporting flange extending from the front panel to the arm extremity providing axial support to the filter in the stream direction and a stiffening flange providing rigidity to the lateral arm.

3. The vehicle air conditioning system as set in claim 2, wherein the stiffening flange is perpendicular to the supporting flange and extends beyond the arm extremity forming the arm ramps.

4. The vehicle air conditioning system as set in claim 2, wherein the service drawer being closed, each of the supporting flanges aligns with a lateral rib constituting straight and continuous lateral surfaces perpendicular to each of the two lateral walls and supports the filter all along each of the two lateral walls.

5. The vehicle air conditioning system as set in claim 1, wherein the service drawer being closed, each of the arm extremities is close to a front extremity of a lateral rib and each of the arm ramps engages under one of the lateral ribs while a fixed ramp engages under one of the lateral arms.

6. The vehicle air conditioning system as set in claim 1, wherein the filter is provided with at least one transverse slit, the slit being shallower than the thickness of the filter to maintain integrity of the filter, the slit opens in a V shape when bending the filter passing through the service opening, in order to make bending of the filter easier when inserting or removing the filter into or from the filter compartment.

7. The vehicle air conditioning system as set in claim 1, wherein the filter compartment is further provided with lateral ribs providing axial support to the filter in the stream direction.

8. The vehicle air conditioning system as set in claim 7, wherein each of the lateral ribs is provided beyond its front extremity with a fixed ramp oriented toward the service opening so that when the service drawer is open, the filter can be guided through the service opening in following the fixed ramps.

* * * * *